R. A. HAMMOND.
DUST DEFLECTING DEVICE FOR CAR WINDOWS.
APPLICATION FILED MAR. 3, 1913.

1,083,536.

Patented Jan. 6, 1914.

Witnesses:
Leonard A. Powell
Franklin E. Low

Inventor:
Robert A. Hammond,
By his attorney,
Charles V. Gooding.

COLUMBIA PLANOGRAPH CO., WASHINGTON, D. C.

UNITED STATES PATENT OFFICE.

ROBERT A. HAMMOND, OF SANDWICH, MASSACHUSETTS.

DUST-DEFLECTING DEVICE FOR CAR-WINDOWS.

1,083,536. Specification of Letters Patent. Patented Jan. 6, 1914.

Application filed March 3, 1913. Serial No. 751,672.

*To all whom it may concern:*

Be it known that I, ROBERT A. HAMMOND, a citizen of the United States, residing at Sandwich, in the county of Barnstable and State of Massachusetts, have invented new and useful Improvements in Dust-Deflecting Devices for Car-Windows, of which the following is a specification.

This invention relates to devices for deflecting dust and cinders from openings in rapidly moving vehicles. In all of the known devices of this character the dust and cinders are directed outwardly from the openings and consequently are directed backwardly toward the successive windows or openings, if there happen to be any, and must be handled or deflected over and over again. Another feature of this character of deflector, which is exceedingly objectionable, is that the dust and cinders are directed outwardly and into the faces of whosoever happens to be near when said vehicle or car is passing.

The object of this invention is to provide a device which is adapted to catch the dust and cinder ladened air tending to pass the immediate vicinity of the window opening, at which said deflector is located, to compress and rotate said current of air and finally discharge the same downwardly sufficiently below said opening to prevent it from passing by the successive opening in said car, and directing the same beneath said car.

A further object of this invention is to provide a deflector adapted to be reversed when the car is driven in the opposite direction.

The invention consists in the combination and arrangement of parts set forth in the following specification and particularly pointed out in the claims.

Figure 1:
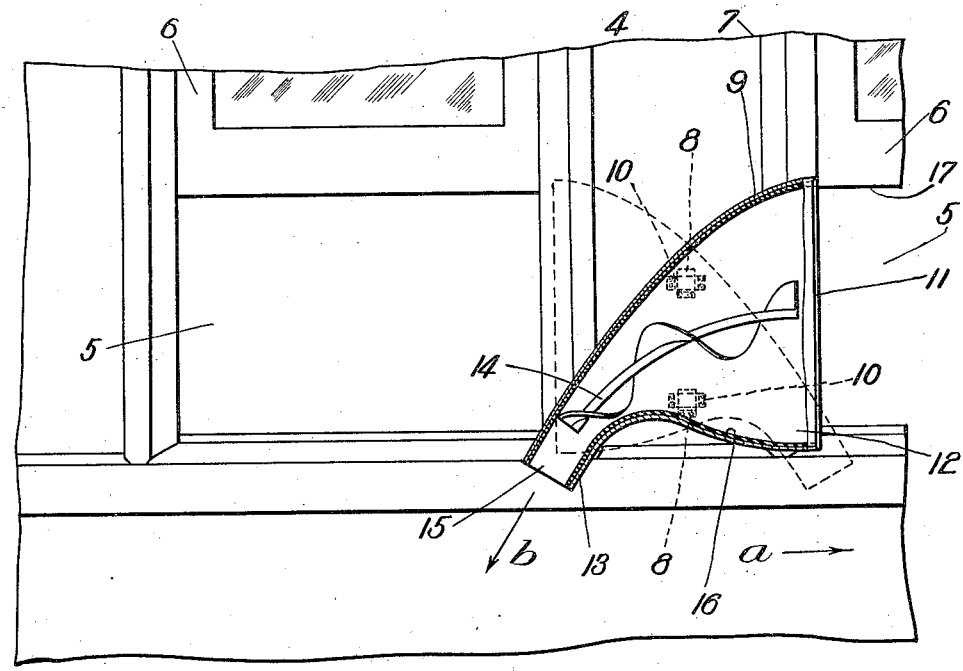
Figure 2:
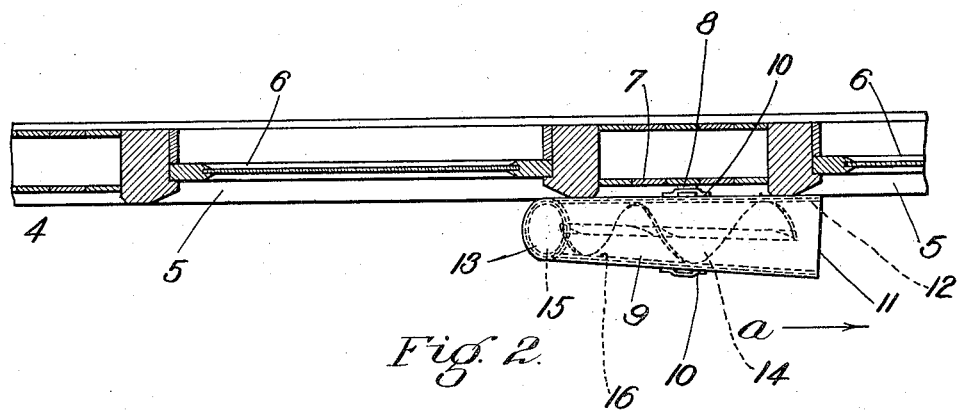

Referring to the drawings: Figure 1 is a side elevation of a portion of a car with a deflector embodying my invention applied thereto, said deflector being shown in its reversed position in dotted lines. Fig. 2 is a plan view of the deflector illustrated in Fig. 1 with a portion of the car to which said deflector is attached shown in section.

Like numerals refer to like parts throughout the several views of the drawings.

In the drawings, 4 is a car or other vehicle having windows 5 provided with sashes 6, the same being shown in their uppermost positions. Secured to the partitions 7 are hooks 8 to which is attached a casing 9 provided with brackets 10 upon opposite faces thereof, which permit said casing 9 to be placed on said hooks to face in either direction relatively to the ends of the car or vehicle to which said casing is attached.

The casing 9 is provided with an elongated opening 11, which is preferably equal in length to the height of the window opening, when the sash thereof is in its uppermost position, said opening 11 being so arranged that a current of air equal in height to the opening in said window and which passes along the side of said car in alinement with said opening will be caught by said casing, said opening being only wide enough to catch the immediate air current in the vicinity of said window opening so as not to occupy much space laterally of the car to interfere with passing objects.

A passage 12, leading from the opening 11, gradually decreases in cross sectional area toward the rear of said casing and is joined at a point substantially below the center of said elongated opening 11 by a depending obliquely disposed cylindrical conductor 13, which terminates at a point below the lower end of said opening 11, said point being below the sill of said window. Located within the casing 9 preferably in the passage 12 is a screw 14, which is secured to the front and back walls of said casing, but otherwise uninclosed thus permitting the air, which is directed into the mouth of the casing against the inclined walls, to be directed against the blades of said screw, as well as at the end, causing said current of air to be rotated in its passage through the depending cylindrical conductor 13 and discharged through the outlet orifice 15 thereof in the form of a whirlwind, said whirlwind having a tendency to draw the dust and cinders toward its center and directing the same with much force downwardly toward the ground. The inner walls of the casing 9 are preferably covered with a suitable hushing material, 16 preferably rubber, which deadens the sound of the cinders and inrushing air as they strike against the inclined walls of said casing.

The general operation of the device, hereinbefore described, is as follows: Assuming the casing 9 to be attached to a car, which is moving in the direction of the arrow "*a*"

with the opening 11 facing in the direction of the forward end of the car, the air ladened with dust and cinders, which has a tendency to pass through the open window 17, will be caught in said casing and directed toward the screw 14 whereupon a rotary motion is imparted thereto through the depending cylindrical conductor 13, through the orifice 15 in the direction of the arrow "$b$," the same being downwardly below the opening in the successive window 18 and from whence it is carried beneath the car. By the rotating of the current of air which passes through said casing a vortex or whirlwind is formed which has a tendency to draw the air in the vicinity thereof in the same direction in which said rotating current of air is passing, thus the current of air passing by the window 18, which would not be caught by the successive dust deflector, would be drawn downwardly together with a portion of the air within the car, thereby preventing any dust from being carried through said window into said car and also serving as a ventilator for said car.

Having thus described my invention what I claim and desire by Letters Patent to secure is:

1. The combination with a car having an opening, of a casing located exteriorly of said car adjacent to said opening provided with a passage adapted to be opened toward the direction of the movement of said car, said passage gradually decreasing in cross sectional area, and a depending conductor connected to said casing at the smaller end of said passage.

2. The combination with a car having a window, of a casing located exteriorly of said car adjacent to said window provided with a passage open toward one end of said car and gradually decreasing in cross sectional area toward the opposite end of said car, a depending conductor connected with said casing at the smaller end of said passage, and means in said passage adapted to impart a rotary motion to the air passing therethrough.

3. The combination with a car having a window, of a casing located exteriorly of said car adjacent to said window provided with a passage adapted to catch the current of air moving longitudinally relatively to said car across the opening in said window, to compress said air in passing therethrough and to direct said compressed current of air downwardly from said casing beneath said window opening, and means in said casing adapted to impart a rotary motion to said air.

4. The combination with a car having a window, of a casing detachably connected exteriorly of said car forwardly of said window, said casing having an elongated opening substantially equal in length to the height of said window opening, said casing gradually decreasing in cross sectional area from said opening to and terminating in a depending cylindrical conductor and a screw disposed within said casing adapted to rotate the current of air passing through said casing.

5. The combination with a car having a window, of a casing located exteriorly of said car adjacent to said window provided with a passage adapted to catch the current of air moving longitudinally relatively to said car across the opening in said window, to compress said air in passing therethrough and to direct said compressed current of air downwardly from said casing beneath said window opening, means in said casing adapted to impart a rotary motion to said air, and resilient material secured to the interior surface of said casing.

In testimony whereof I have hereunto set my hand in presence of two subscribing witnesses.

ROBERT A. HAMMOND.

Witnesses:
SYDNEY E. TAFT,
ANNIE J. DAILEY.

---

Copies of this patent may be obtained for five cents each, by addressing the "Commissioner of Patents, Washington, D. C."